US012692910B1

(12) United States Patent
Tan et al.

(10) Patent No.: US 12,692,910 B1
(45) Date of Patent: Jul. 28, 2026

(54) F CLUTCH DRUM AND METHOD FOR IMPROVING PERFORMANCE OF F CLUTCH DRUM

(71) Applicant: FEDERAL NEW POWER (QINGDAO) CO., LTD., Qingdao (CN)

(72) Inventors: Tao Tan, Qingdao (CN); Lianlian Yin, Qingdao (CN)

(73) Assignee: FEDERAL NEW POWER (QINGDAO) CO., LTD., Qingdao (CN)

( * ) Notice: Subject to any disclaimer, the term of this patent is extended or adjusted under 35 U.S.C. 154(b) by 0 days.

(21) Appl. No.: 19/277,947

(22) Filed: Jul. 23, 2025

(30) Foreign Application Priority Data

Jun. 26, 2025 (CN) .......................... 202510873021.2

(51) Int. Cl.
F16D 13/62 (2006.01)
(52) U.S. Cl.
CPC ...... F16D 13/62 (2013.01); F16D 2200/0021 (2013.01); F16D 2200/003 (2013.01); F16D 2200/0086 (2013.01); F16D 2300/26 (2013.01)

(58) Field of Classification Search
CPC ............ F16D 13/62; F16D 2200/0021; F16D 2200/003; F16D 2200/0086; F16D 2300/26; F16H 57/032; F16H 57/03; F16H 2057/02047
See application file for complete search history.

(56) References Cited

U.S. PATENT DOCUMENTS

| | | | |
|---|---|---|---|
| 8,197,202 B2 * | 6/2012 | Olsen ...................... | F16H 41/28 |
| | | | 415/209.3 |
| 2017/0211633 A1 * | 7/2017 | Tabuchi .................. | F16D 13/62 |
| 2017/0241485 A1 * | 8/2017 | Piper ....................... | F16D 1/116 |
| 2020/0298304 A1 * | 9/2020 | Nakamura .............. | C22C 21/02 |

FOREIGN PATENT DOCUMENTS

WO      WO-2004091832 A1 * 10/2004 ............. B22D 19/00

* cited by examiner

*Primary Examiner* — Lori Wu
(74) *Attorney, Agent, or Firm* — SZDC Law PC

(57) ABSTRACT
The present application relates to an F clutch drum, which includes a clutch drum body and a gear ring fixed to an inner wall of the clutch drum body by foundry steel insert for cooperation with a clutch plate of the F clutch; the clutch drum body is made of aluminum alloy; the gear ring is made of alloy steel. The upgraded drum, as a brand-new insert design process, is formed by extruding and stamping alloy steel sheets. However, it is difficult to meet the dimensional requirements of the connecting teeth. Iron bars are welded around the steel sheets. This maintains uniform spacing between each tooth and ensures that the connection dimensions meet the requirements.

11 Claims, 7 Drawing Sheets

2-2

2-1

C 2-2

C 2-1

2-2

2-1

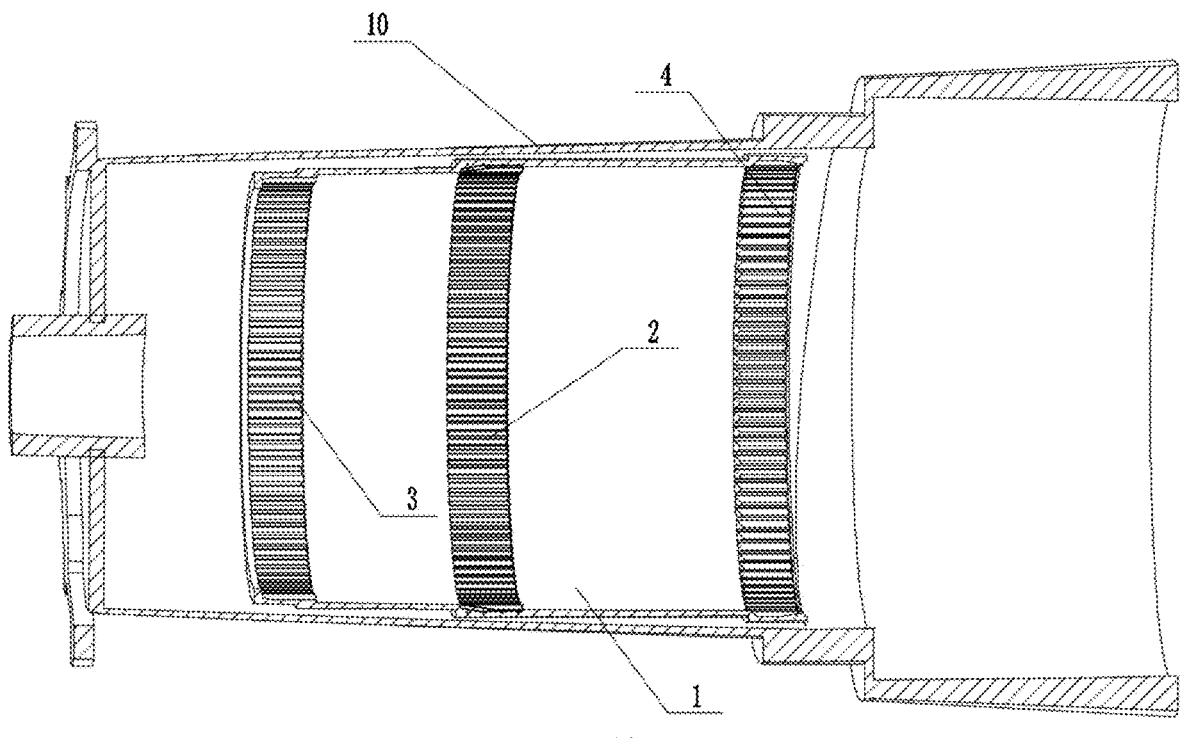
FIG. 13
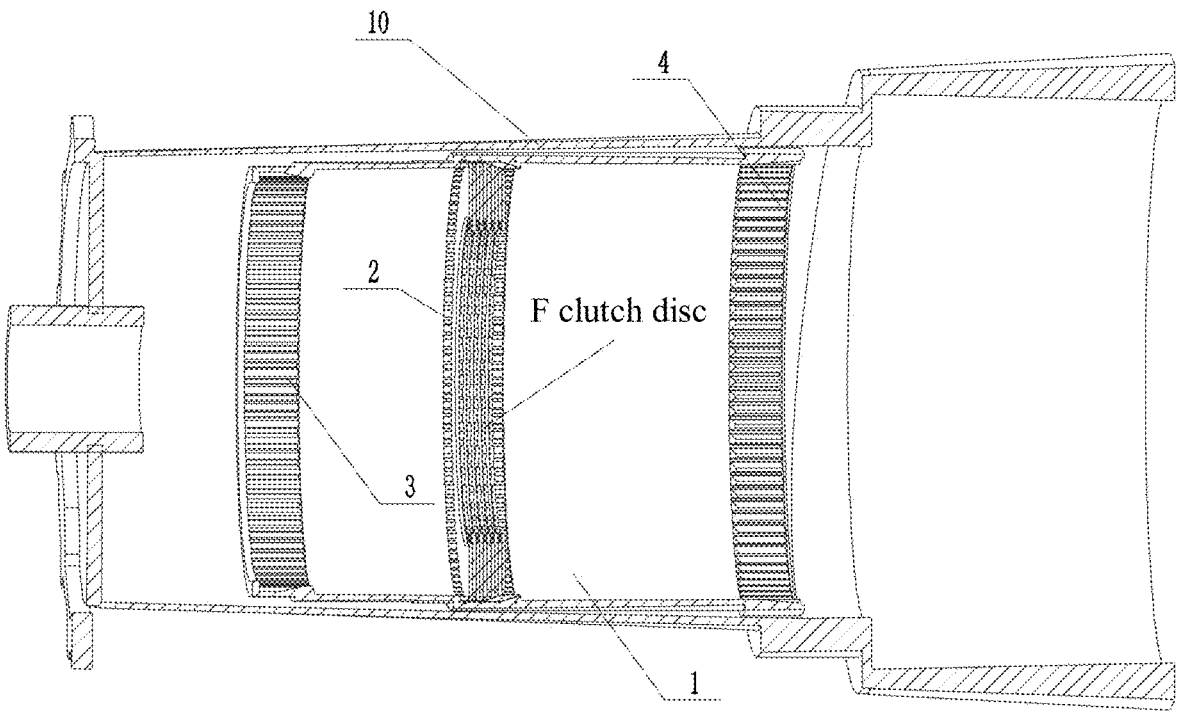
FG. 14

F CLUTCH DRUM AND METHOD FOR IMPROVING PERFORMANCE OF F CLUTCH DRUM

This application claims priority to Chinese Patent Application No. 202510873021.2 filed on Jun. 26, 2025, which is incorporated by reference for all purposes as if fully set forth herein.

CROSS-REFERENCE TO RELATED APPLICATIONS

This application claims priority to Chinese Patent Application No. 202510873021.2, filed on Jun. 26, 2025, the entire disclosure of which is incorporated herein by reference.

TECHNICAL FIELD

The present application relates to the technical field of automobile transmissions, and relates to an F clutch drum and a method for improving the performance of the F clutch drum.

BACKGROUND

Transmissions of models 10L1000, 10L90, 10L80, 10R140, 10R80, and 10R60 are commonly used in pickup trucks and cars of Ford and General Motors brands. The F clutch drums used in these transmissions are made of aluminum alloy. The reason for using aluminum alloy is that the internal magnetic signals need to pass through the F clutch drum and be transmitted outward to the external magnetic signal receiving device. To ensure the smooth transmission of internal magnetic signals, the original design of the F clutch drums for the 10L1000, 10L90, 10L80, 10R140, 10R80, and 10R60 transmissions was 100% aluminum alloy casting. Although this material can meet the requirements of signal transmission, it is relatively soft and prone to damage during use. Especially at the teeth inside the F clutch drum that connect to the F clutch, frequent impacts with steel clutch plates (including friction plates and steel plates) during use can easily cause the F clutch drum to break at this position.

SUMMARY

In view of the problems existing in the related art, the present application provides an F clutch drum, which includes a clutch drum body and a gear ring fixed to an inner wall of the clutch drum body by foundry steel insert for cooperation with a clutch plate of the F clutch; the clutch drum body is made of aluminum alloy; the gear ring is made of alloy steel.

On the basis of the above solution, the gear ring includes a toothed ring formed by stamping or extruding an alloy steel sheet and a plurality of metal rings sleeved on the toothed ring to constrain the toothed ring, and a joint between the metal ring and an outer wall of the toothed ring is fixed by welding.

In one embodiment, the gear ring comprises a toothed ring stamped from an alloy steel sheet and a plurality of metal rings sleeved on the toothed ring to constrain the toothed ring, and a joint between each metal ring and an outer wall of the toothed ring is fixed by welding.

In one embodiment, the toothed ring stamped from the alloy steel sheet comprises teeth and a tooth groove;

a back groove for injecting aluminum alloy during casting of the body is formed on a back of the teeth; a joint portion for welding and fixing the toothed ring and the metal ring is formed on a back of the tooth groove, and the metal ring is not connected to the toothed ring at the back groove.

In one embodiment, the metal ring is made of alloy steel.

In one embodiment, the F clutch drum further includes a first annular gear ring and a second annular gear ring formed at both ends of the clutch drum body.

The present application also provides a method for improving the performance of an F clutch drum, which includes:

S1, stamping an alloy steel sheet to form teeth, a tooth groove, and s back groove;

S2, bending the stamped alloy steel sheet into a ring shape and fitting the ring shape into a metal ring;

S3, welding and fixing the metal ring and a toothed ring at a joint portion to form a gear ring;

S4, placing the gear ring in a mold for casting a clutch drum body and casting the clutch drum body by foundry steel insert;

S5, injecting aluminum alloy liquid into the mold, where the aluminum alloy liquid enters the back grooves at the gear ring and wraps the metal ring; after cooling, the metal ring at the back groove is firmly fixed by an aluminum alloy in the back groove and an aluminum alloy of the clutch drum body.

The present application also provides a transmission housing, comprising a transmission outer housing and an F clutch drum disposed in the transmission outer housing, wherein the F clutch drum is the F clutch drum as mentioned above or the F clutch drum prepared by the method as mentioned above.

The present application also provides a transmission, wherein the transmission housing of the transmission comprises a transmission outer housing and an F clutch drum disposed in the transmission outer housing, wherein the F clutch drum is the F clutch drum as mentioned above or the F clutch drum prepared by the method as mentioned above.

In one embodiment, the transmission refers to a transmission of model 10L1000, 10L90, 10L80, 10R140, 10R80, or 10R60.

Beneficial effects of the present application:

The upgraded drum of the present application adopts a brand-new insert design process, which is formed by extruding and stamping alloy steel sheets. However, it is difficult to meet the dimensional requirements of the connecting teeth. Therefore, iron bars are welded around the steel sheets to maintain uniform spacing between each tooth and ensure that the connection dimensions meet the requirements. More importantly, the metal rings welded on the outer periphery are subsequently cast inside the aluminum alloy, thereby ensuring a firm connection between the steel sheet and the aluminum alloy, preventing the steel sheet from disengaging out of the aluminum alloy. The steel sheet insert and the peripherally welded metal rings together form an integral insert, with aluminum wrapping steel and steel embedded with aluminum, to create a unified whole.

The F clutch drum of the present application fixes the alloy steel gear ring inside the aluminum alloy clutch drum body through foundry steel insert. This not only meets the overall material requirements of the F clutch drum but also effectively enhances the strength of the F clutch drum at the cooperation with the clutch plates, avoiding the problem of breakage at this position during use.

Furthermore, the gear ring of the present application is made by extruding or stamping alloy steel sheets. When forming a ring, metal rings made of alloy steel are welded on the outside. On one hand, this maintains uniform spacing between each tooth of the gear ring and ensures that the connection dimensions meet the requirements. On the other hand, the externally welded metal rings are subsequently cast inside the aluminum alloy, ensuring a firm connection between the steel sheet and the aluminum alloy, preventing the steel sheet from disengaging out of the aluminum alloy. The steel sheet insert (i.e., the toothed ring) and the peripherally welded metal rings together form an integral insert (i.e., the gear ring), which is insert-cast with the clutch drum body, with aluminum wrapping steel and steel embedded with aluminum, to create a unified whole. At the same time, the gear ring of this structure enhances the firmness of the connection between the clutch drum body and the gear ring. The aluminum alloy liquid filled in the back grooves can enhance the strength of the teeth after cooling.

BRIEF DESCRIPTION OF THE DRAWINGS

FIG. 13 is a cross-sectional schematic diagram along a B-B direction of FIG. 12.

FIG. 14 is a cross-sectional schematic diagram along the B-B direction of FIG. 12 (including F clutch plates).

DETAILED DESCRIPTION OF THE EMBODIMENTS

Figure 1:
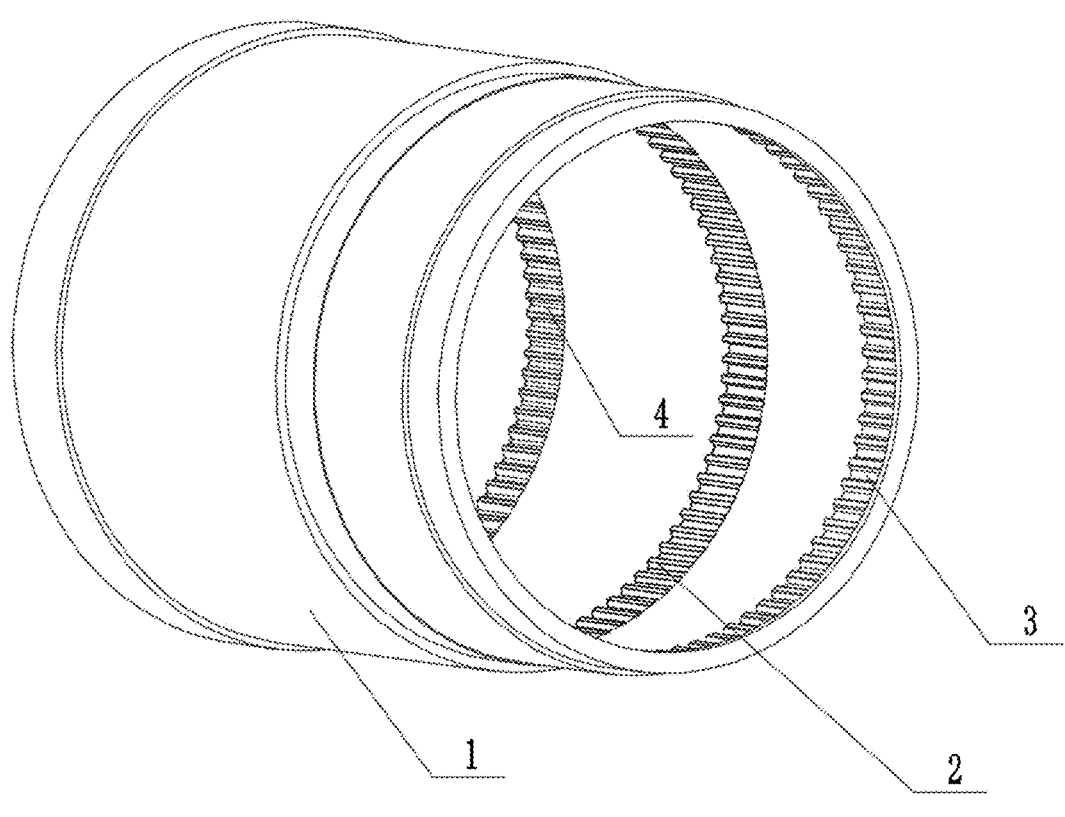
FIG. 1 is a three-dimensional structural schematic diagram of an F clutch drum in Embodiment 1 of the present application.

To make the objectives, technical solutions, and advantages of the embodiments of the present application clearer, the technical solutions in the embodiments of the present application will be clearly and completely described below in conjunction with the accompanying drawings in the embodiments of the present application. Obviously, the described embodiments are part of the embodiments of the present application, rather than all of them. Generally, the components of the embodiments of the present application described and shown in the drawings here can be arranged and designed in various different configurations.

Embodiment 1

Figure 2:
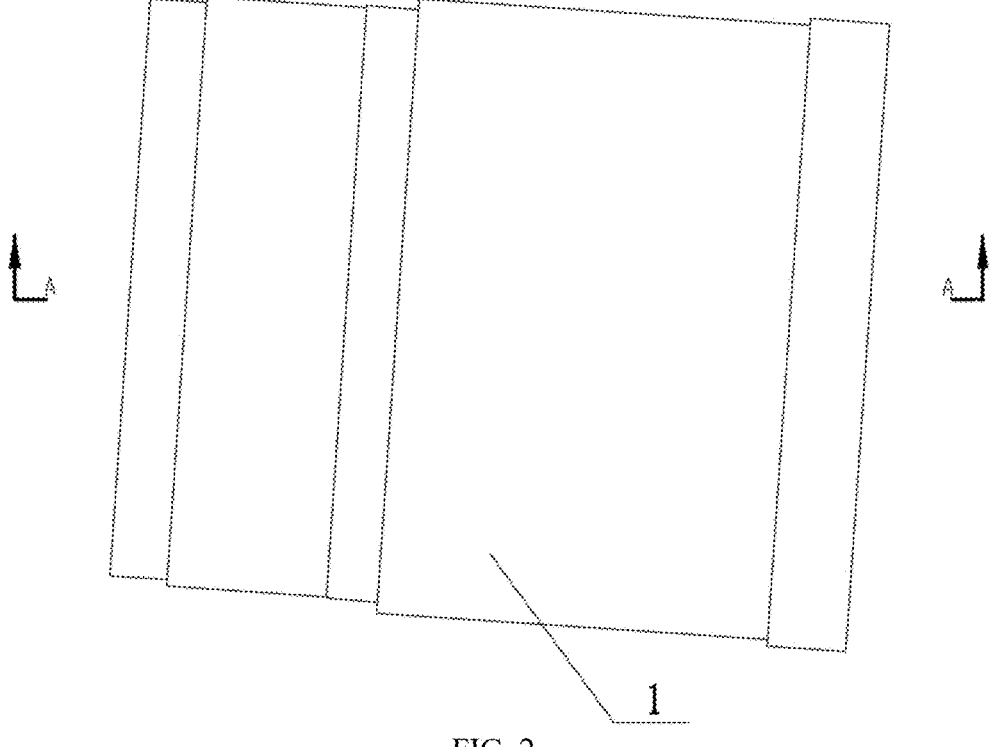
FIG. 2 is a structural schematic diagram of the F clutch drum in Embodiment 1 of the present application.
Figure 3:
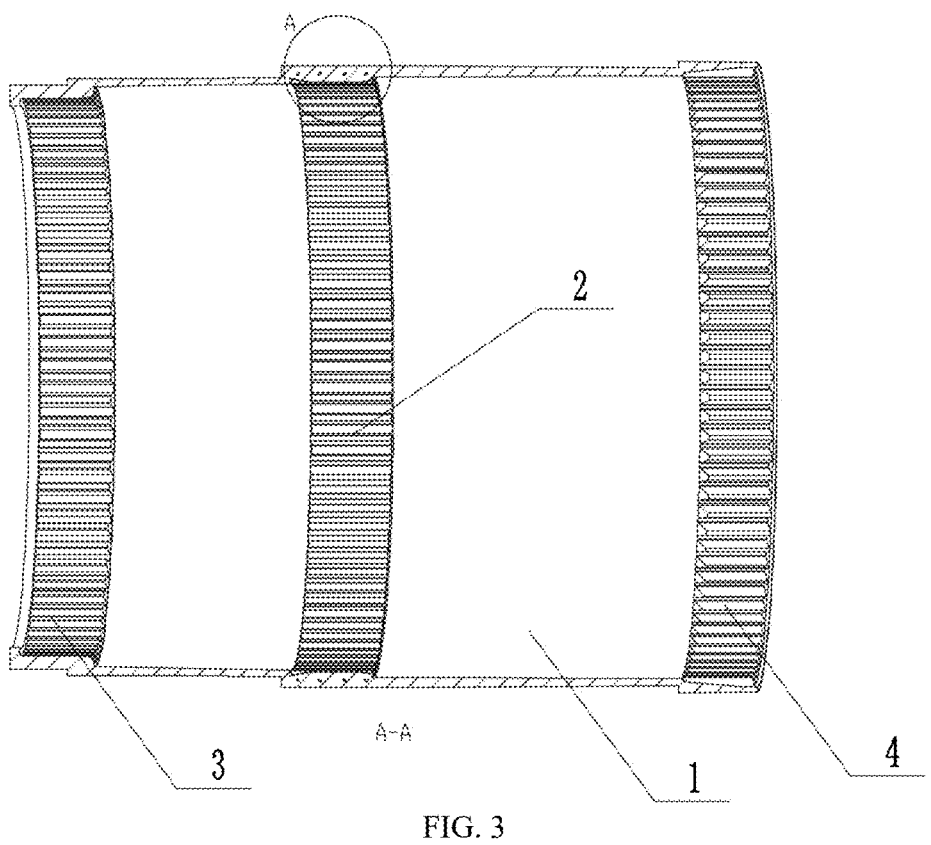
FIG. 3 is a cross-sectional schematic diagram along a A-A direction of FIG. 2.
Figure 4:
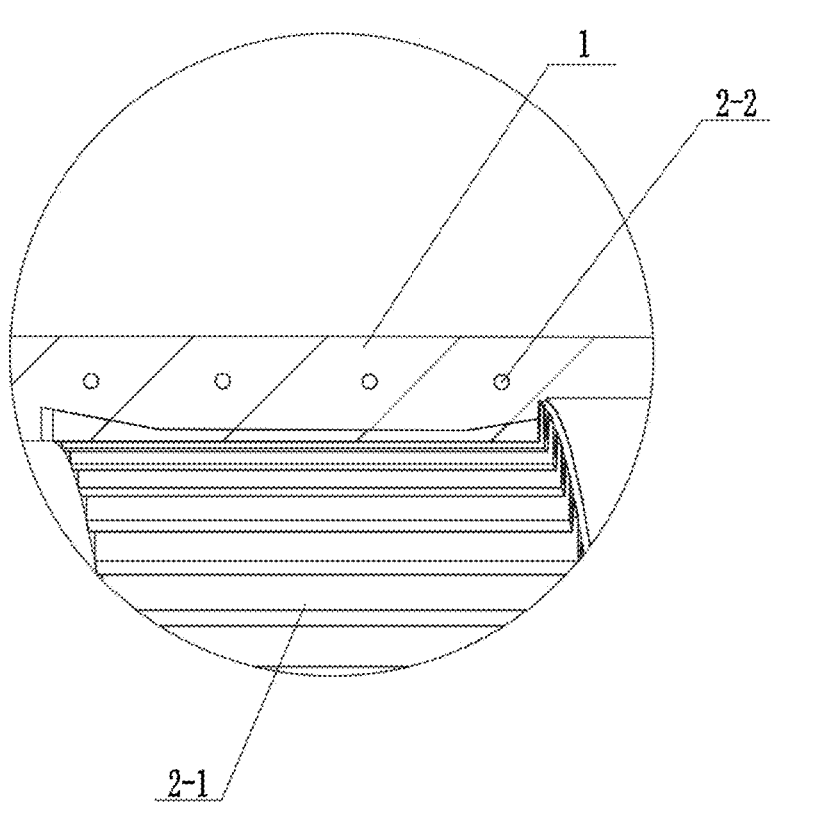
FIG. 4 is an enlarged structural schematic diagram of part A in FIG. 3.

As shown in FIG. 1, FIG. 2, and FIG. 3, the present application provides an F clutch drum (F Drum). The F clutch drum includes a clutch drum body 1 and a gear ring 2 fixed to an inner wall of the clutch drum body 1 by foundry steel insert, which is used to cooperate with a clutch plate of the F clutch; the clutch drum body 1 is made of aluminum alloy; the gear ring 2 is made of alloy steel. Since the position of the gear ring 2 is not where the magnetic signal needs to penetrate, alloy steel can be used here. T The above-mentioned "foundry steel insert" refers to placing the gear ring 2 in the mold in advance when casting the clutch drum body 1. After the molten aluminum alloy liquid solidifies in the mold, the gear ring 2 is firmly fixed on the inner wall of the clutch drum body 1.

In this way, the alloy steel gear ring 2 can be fixed on the inner wall of the aluminum alloy clutch drum body 1, which not only meets the overall material requirements of the F clutch drum but also effectively enhances the strength of the F clutch drum at the position where it cooperates with the clutch plates of the F clutch, avoiding the problem of the F clutch drum breaking at this position during use.

The alloy steel gear ring 2 can be manufactured by traditional methods, such as traditional mechanical processing to form teeth. However, since the F clutch drum needs to be placed in the transmission housing 10 during use (as shown in FIGS. 11-14), and the space between the transmission housing and the F clutch drum is only 2-3 mm, there are strict requirements on the wall thickness of the F clutch drum. If the entire gear ring 2 is prepared by mechanical processing or casting, it is difficult to meet the precision requirements of the transmission housing. In addition, when the gear ring 2 prepared by traditional methods is fixed on the inner wall of the clutch drum body 1 by foundry steel insert, the connection between the outer wall of the gear ring 2 and the inner wall of the clutch drum body 1 is not firm enough, which may easily cause the gear ring 2 to separate from the clutch drum body 1.

Therefore, the present application provides a new gear ring 2, which can not only meet the precision requirements of the transmission housing for the F clutch drum but also effectively enhance the strength of the F clutch drum, and greatly enhance the firmness of the connection between the gear ring 2 and the inner wall of the clutch drum body 1.

Specifically, as shown in FIGS. 3-10, the gear ring 2 includes a toothed ring 2-1 formed by stamping an alloy steel sheet and several metal rings 2-2 sleeved on the toothed ring 2-1 to constrain the toothed ring 2-1. A joint between the metal ring 2-2 and the outer wall of the toothed ring 2-1 is fixed by welding. In addition to stamping, extrusion can also be used for forming.

First, a thickness of the alloy steel sheet is thin (for example, an alloy manganese steel sheet with a thickness of 0.75 mm can be used). The toothed ring 2-1 formed by stamping the alloy steel sheet can meet the thickness requirements of the F clutch drum and also meet the strength requirements of the F clutch drum for the gear ring 2. Secondly, sleeving the metal rings 2-2 outside the toothed ring 2-1 can constrain the shape of the toothed ring 2-1. After fixing the joint between the metal ring 2-2 and the outer wall of the toothed ring 2-1 by welding, when the gear ring 2 is fixed on the inner wall of the clutch drum body 1 by foundry steel insert, the firmness of the connection between the clutch drum body 1 and the gear ring 2 can be effectively enhanced.

Figure 5:
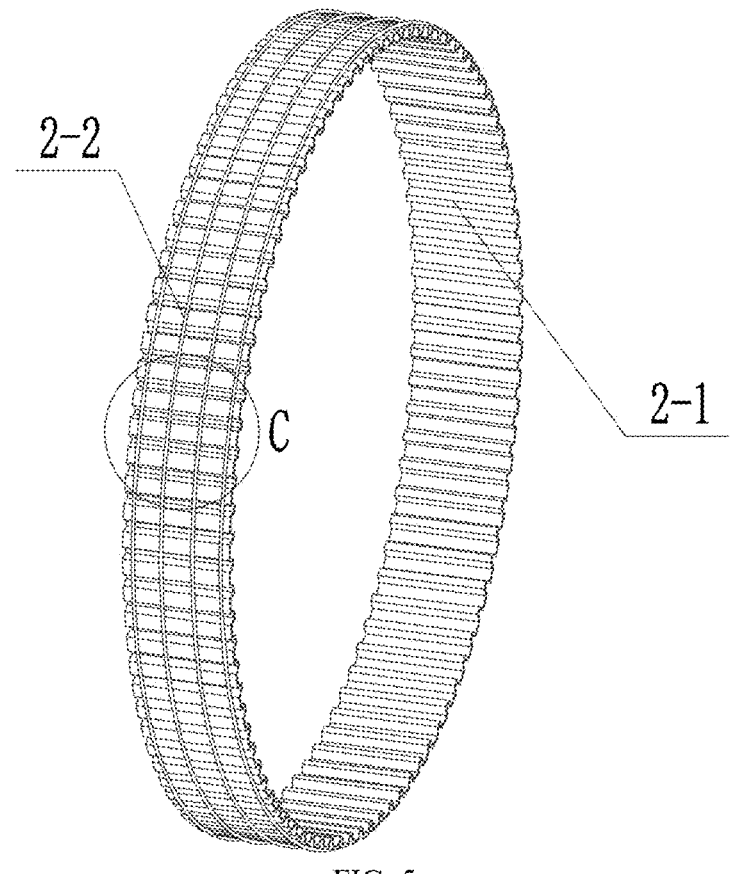
FIG. 5 is a three-dimensional structural schematic diagram of a gear ring in the F clutch drum of the present application.
Figure 6:
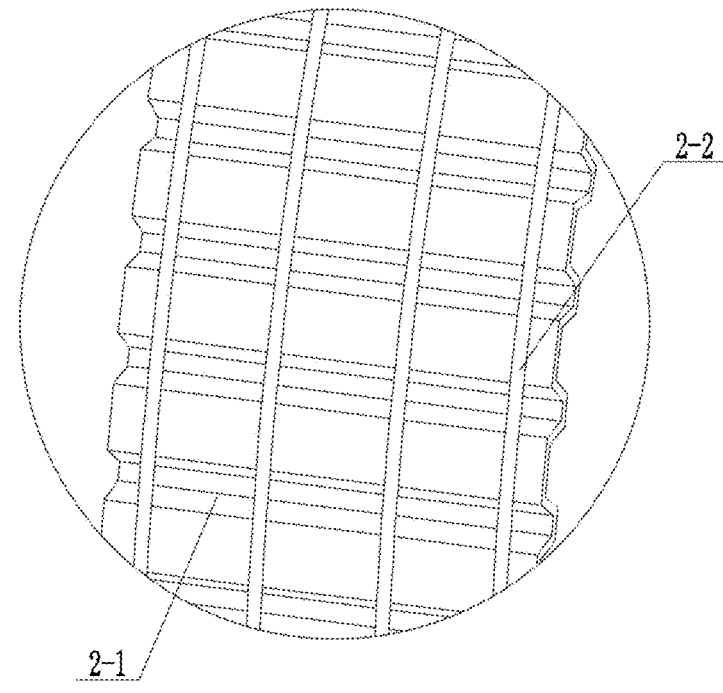
FIG. 6 is an enlarged structural schematic diagram of part C in FIG. 5.

The metal ring 2-2 can be made of alloy steel, and there are more than 2 metal ring 2-2. In FIG. 5, there are 4 metal rings 2-2.

Figure 7:
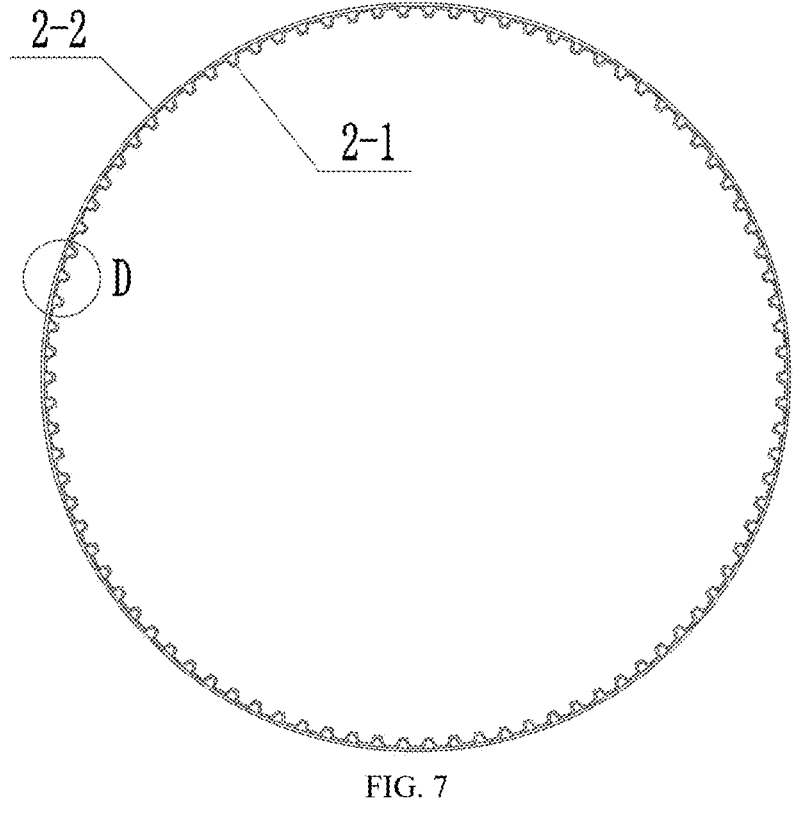
FIG. 7 is a front-view structural schematic diagram of the gear ring in the F clutch drum of the present application.
Figure 8:
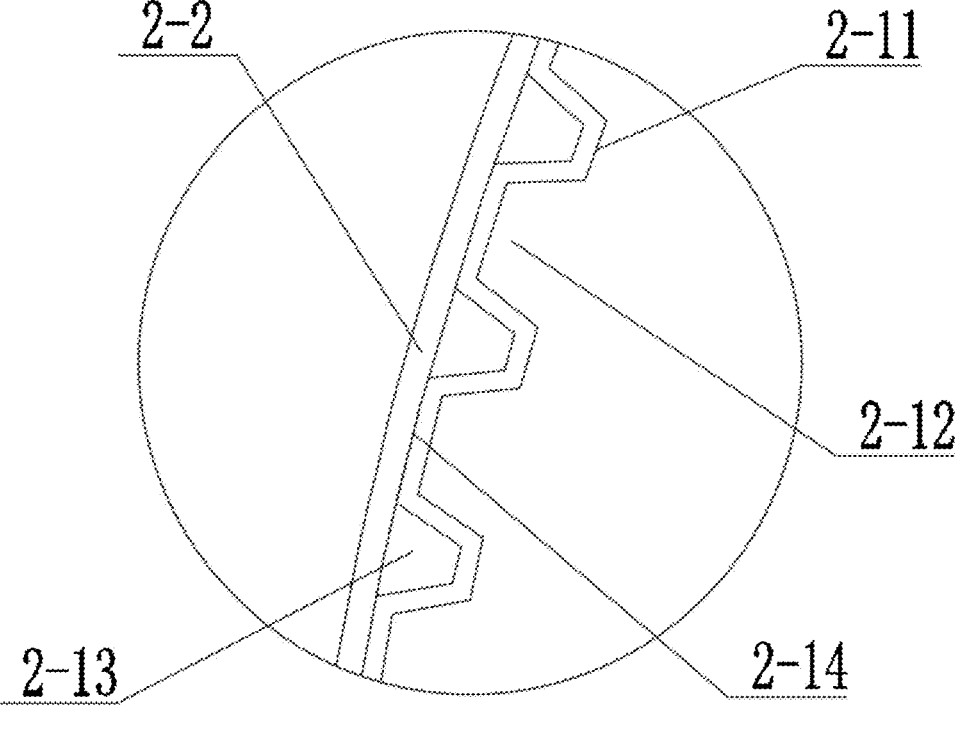
FIG. 8 is an enlarged structural schematic diagram of part D in FIG. 7.

As shown in FIGS. 7 and 8, the toothed ring 2-1 formed by stamping the alloy steel sheet includes gear teeth 2-11 and a tooth groove 2-12. A back of the gear teeth 2-11 is formed with a back groove 2-13 for injecting aluminum alloy during the casting of the body 1. A back of the tooth groove 2-12 is formed with a joint portion 2-14 for welding and fixing the toothed ring 2-1 and the metal ring 2-2, and the metal ring 2-2 is not connected to the toothed ring 2-1 at the back groove 2-13.

With this structure, during the casting of the clutch drum body 1, the aluminum alloy liquid can fill the back groove 2-13, and the aluminum alloy liquid also wraps the metal ring 2-2 at the back groove 2-13. After the aluminum alloy liquid cools, the clutch drum body 1 and the metal ring 2-2 are firmly fixed together, thereby enhancing the firmness of the connection between the clutch drum body 1 and the gear ring 2. The aluminum alloy liquid filled in the back groove 2-13 can enhance the strength of the gear teeth 2-11 after cooling.

Figure 9:
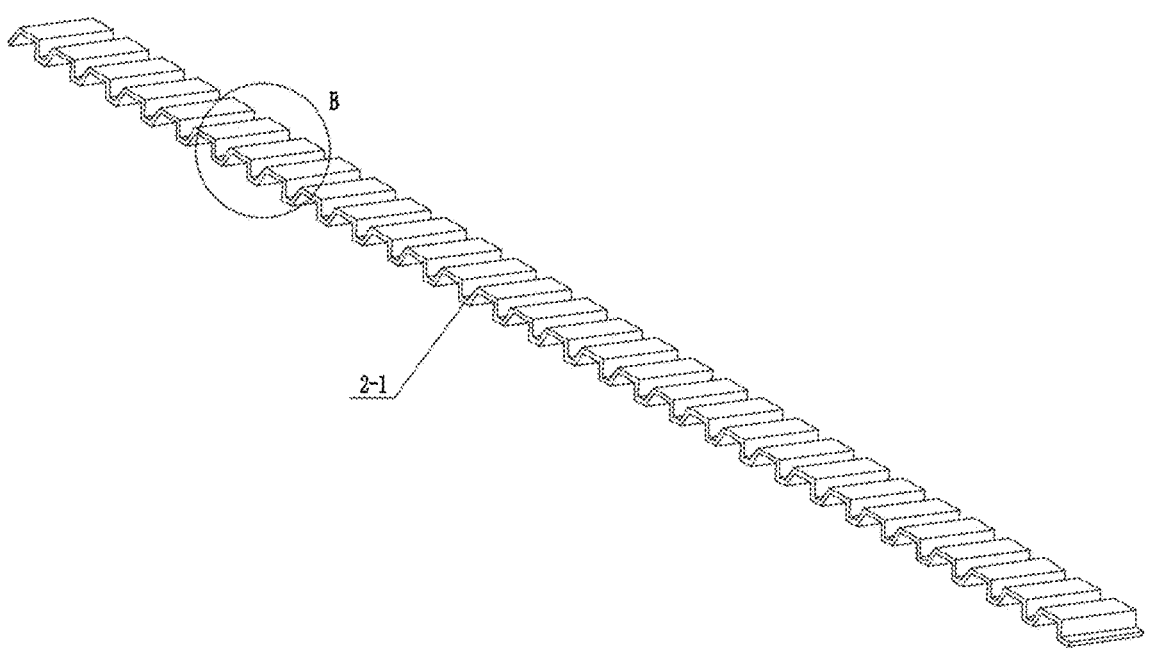
FIG. 9 is a structural schematic diagram of a gear teeth in the F clutch drum after stamping and before forming a ring.
Figure 10:
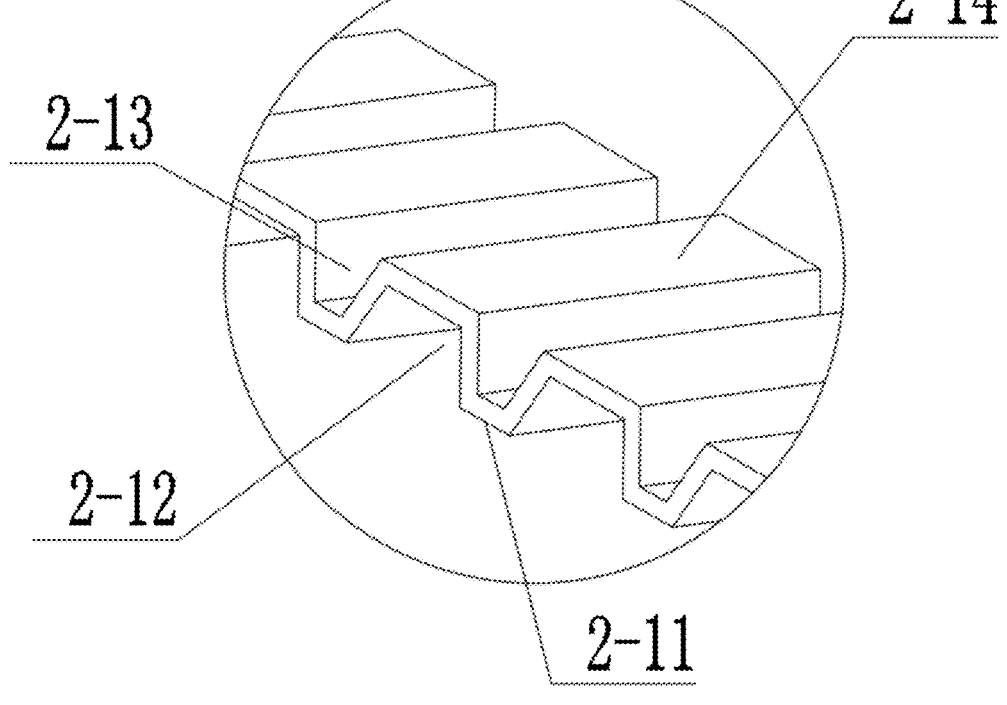
FIG. 10 is an enlarged structural schematic diagram of part B in FIG. 9.

The method for improving the performance of the F clutch drum adopts the following steps:

S1, Stamping or extruding the alloy steel sheet to form gear teeth 2-11, a tooth groove 2-12, and a back groove 2-13; the stamped alloy steel sheet is as shown in FIG. 9;

S2, Bending the stamped alloy steel sheet into a ring shape and sleeving it into the metal ring 2-2;

S3, Welding and fixing the metal ring 2-2 and the toothed ring 2-1 at the joint portion 2-14 to form the gear ring 2;

S4 Placing the gear ring 2 in the mold (i.e., the casting mold) for casting the body 1;

S5, Injecting aluminum alloy liquid into the mold. At the position of the gear ring 2, the aluminum alloy liquid enters the back groove 2-13 and wraps the metal ring 2-2; after cooling, the metal ring 2-2 at the back groove 2-13 is firmly fixed by the aluminum alloy in the back groove 2-13 and the aluminum alloy of the body 1.

The performance mentioned in improving the performance of the F clutch drum mainly refers to improving the strength of the F clutch drum, especially the strength of the F clutch drum at the position corresponding to the gear ring 2.

The toothed ring 2-1 is formed by stamping an alloy manganese steel sheet (extrusion can also be used). The toothed ring formed in this way is in a spring state before being fixed (as shown in FIG. 9). This will cause the distance between each tooth to be unstable, making it difficult to match the size requirements of the cooperating clutch plates. The use of the metal ring 2-2, on the one hand, keeps the distance between each tooth uniform and ensures that the connection size meets the requirements; on the other hand, and more importantly, the peripherally welded metal rings are subsequently cast inside the aluminum alloy, thereby ensuring that the steel sheet (i.e., the toothed ring 2-1) is firmly connected to the aluminum alloy and will not come out of the aluminum alloy clutch drum body 1. The steel sheet insert (i.e., the toothed ring 2-1) and the peripherally welded metal ring 2-2 together form an integral insert (i.e., the gear ring 2). The gear ring 2 and the clutch drum body

1 are insert-cast together, with aluminum wrapping steel and steel embedded with aluminum, to create an integral whole.

The alloy steel gear ring 2 is used to cooperate with the friction plates and steel plates of the clutch. During use, the friction plates and steel plates will collide with the alloy steel gear ring 2. The connection surface of the traditional F clutch drum is made of aluminum alloy, which is particularly soft and will break due to long-term collision. The alloy steel gear ring 2 of the structure of the present application has a higher surface hardness than the internal clutch connecting teeth, which can greatly enhance the strength of the F clutch drum and avoid damage due to long-term collision.

Embodiment 2

As shown in FIG. 3, based on the F clutch drum in Embodiment 1, it further includes a first annular gear ring 3 and a second annular gear ring 4 formed at both ends of the clutch drum body 1.

The first annular gear ring 3 and the second annular gear ring 4 are respectively used to cooperate with the splines of the F clutch. The first annular gear ring 3 and the second annular gear ring 4 of the traditional F clutch drum are also made of aluminum alloy, and they are integrally cast with the clutch drum body 1. To enhance the overall strength of the F clutch drum, both the first annular gear ring 3 and the second annular gear ring 4 can adopt the structure of the gear ring 2 in Embodiment 1.

Embodiment 3

Figure 11:
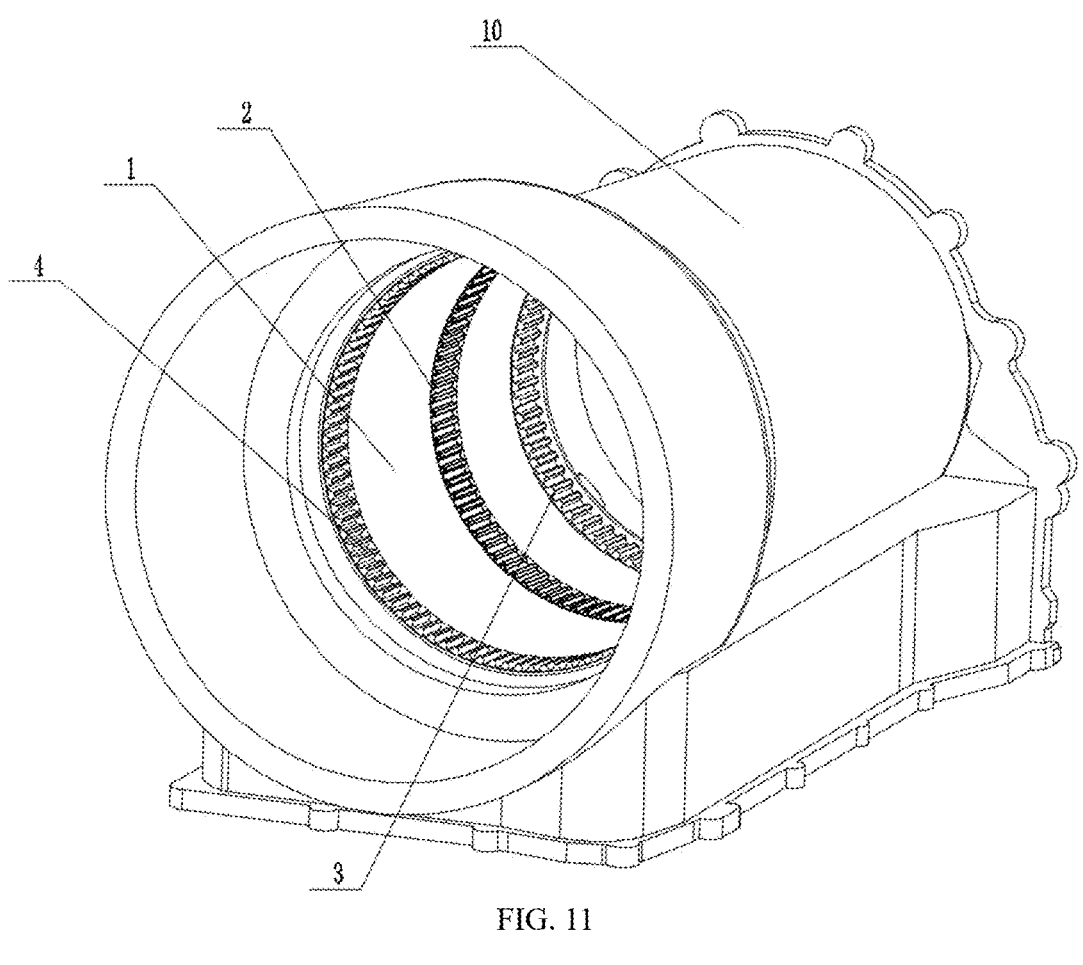
FIG. 11 is a three-dimensional structural schematic diagram of a transmission housing of the present application.
Figure 12:
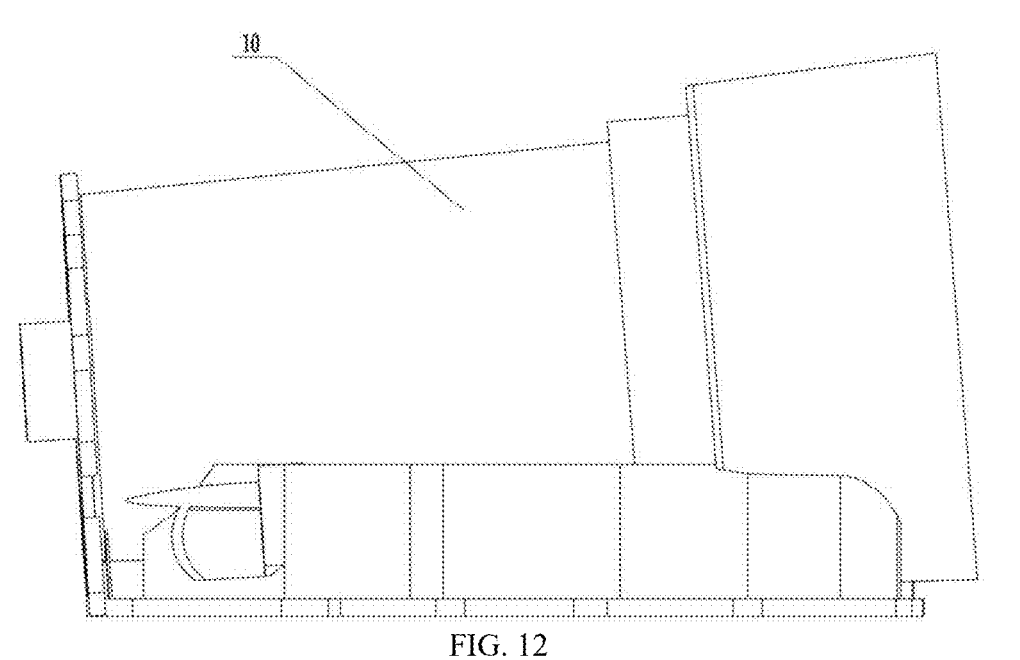
FIG. 12 is a front-view structural schematic diagram of the transmission housing of the present application.

Based on the F clutch drum in Embodiment 1 or 2, as shown in FIGS. 11-13, the present application also provides a transmission housing, which includes a transmission outer housing 10 and an F clutch drum arranged in the transmission outer housing 10. The F clutch drum includes a clutch drum body 1 and a gear ring 2 fixed to the inner wall of the clutch drum body 1 by foundry steel insert, which is used to cooperate with the clutch plates of the F clutch; the clutch drum body 1 is made of aluminum alloy. The gear ring 2 is made of alloy steel.

Embodiment 4

Based on the transmission housing in Embodiment 3, the present application provides a transmission, specifically a transmission of models 10L1000, 10L90, 10L80, 10R140, 10R80, or 10R60. The transmission provided in this embodiment is based on the original model transmission, with the F clutch drum in the original model transmission replaced by the F clutch drum in Embodiment 1 or 2 of the present application. This can effectively improve the service life of the transmission.

It should be noted that the features in the embodiments of the present application can be combined with each other without conflict. The above are only the preferred embodiments of the present application and are not intended to limit the present application. For those skilled in the art, the present application can have various modifications and changes. Any modification, equivalent replacement, improvement, etc. made within the spirit and principle of the present application shall be included in the protection scope of the present application.

7

What is claimed is:

1. An F clutch drum, comprising a clutch drum body and a gear ring fixed to an inner wall of the clutch drum body by foundry steel insert for cooperation with a clutch plate of the F clutch;

the clutch drum body is made of aluminum alloy; and
the gear ring is made of alloy steel,
wherein the gear ring comprises a toothed ring stamped from an alloy steel sheet and a plurality of metal rings sleeved on the toothed ring to constrain the toothed ring, and a joint between each metal ring and an outer wall of the toothed ring is fixed by welding.

2. The F clutch drum according to claim 1, wherein the toothed ring stamped from the alloy steel sheet comprises teeth and a tooth groove;

a back groove for injecting aluminum alloy during casting of the body is formed on a back of the teeth; a joint portion for welding and fixing the toothed ring and each metal ring is formed on a back of the tooth groove, and each metal ring is not connected to the toothed ring at the back groove.

3. The F clutch drum according to claim 1, wherein each metal ring is made of alloy steel.

4. The F clutch drum according to claim 1, further comprising a first annular gear ring and a second annular gear ring formed at both ends of the clutch drum body.

5. A transmission housing, comprising a transmission outer housing and an F clutch drum disposed in the transmission outer housing, wherein the F clutch drum is the F clutch drum of claim 1.

6. A transmission, wherein the transmission housing of the transmission comprises a transmission outer housing and an F clutch drum disposed in a transmission outer housing, wherein the F clutch drum is the F clutch drum of claim 1.

7. The transmission according to claim 6, wherein the transmission refers to a transmission of model 10L1000, 10L90, 10L80, 10R140, 10R80, or 10R60.

8. A method for improving the performance of an F clutch drum, comprising:

stamping an alloy steel sheet to form teeth, a tooth groove, and a back groove;
bending the stamped alloy steel sheet into a ring shape and fitting the ring shape into a metal ring;
welding and fixing the metal ring and a toothed ring at a joint portion to form a gear ring;
placing the gear ring in a mold for casting a clutch drum body and casting the clutch drum body by foundry steel insert; and
injecting aluminum alloy liquid into the mold, where the aluminum alloy liquid enters the back grooves at the gear ring and wraps the metal ring; after cooling, the metal ring at the back groove is firmly fixed by an aluminum alloy in the back groove and an aluminum alloy of the clutch drum body.

9. A transmission housing, comprising a transmission outer housing and an F clutch drum disposed in the transmission outer housing, wherein the F clutch drum is the F clutch drum prepared by the method of claim 8.

10. A transmission, wherein the transmission housing of the transmission comprises a transmission outer housing and an F clutch drum disposed in a transmission outer housing, wherein the F clutch drum prepared by the method of claim 8.

11. The transmission according to claim 10, wherein the transmission refers to a transmission of model 10L1000, 10L90, 10L80, 10R140, 10R80, or 10R60.

* * * * *